US006420019B1

(12) United States Patent
Peiffer et al.

(10) Patent No.: US 6,420,019 B1
(45) Date of Patent: Jul. 16, 2002

(54) MULTILAYER, TRANSPARENT, BIAXIALLY ORIENTED POLYESTER FILM

(75) Inventors: Herbert Peiffer, Mainz; Gottfried Hilkert, Saulheim, both of (DE)

(73) Assignee: Mitsubishi Polyester Film GmbH (DE)

( * ) Notice: Subject to any disclaimer, the term of this patent is extended or adjusted under 35 U.S.C. 154(b) by 0 days.

(21) Appl. No.: 09/892,175

(22) Filed: Jun. 26, 2001

(30) Foreign Application Priority Data

Jul. 26, 2000 (DE) .......................... 100 36 407

(51) Int. Cl.$^7$ ..................... B32B 27/20; B32B 27/36; B32B 31/16; B32B 31/26; B32B 31/30
(52) U.S. Cl. ................. 428/332; 428/323; 428/328; 428/329; 428/330; 428/331; 428/910; 428/480; 264/173.11; 264/173.12; 264/173.15; 264/173.16; 264/288.4; 264/290.2
(58) Field of Search ................. 428/323, 328, 428/329, 330, 331, 332, 480, 910; 264/173.11, 173.12, 173.15, 173.16, 288.4, 290.2

(56) References Cited

U.S. PATENT DOCUMENTS

| 5,366,783 | A | * | 11/1994 | Utsumi et al. ............... 428/141 |
| 5,441,800 | A | * | 8/1995 | Utsumi ......................... 428/323 |
| 5,585,177 | A | * | 12/1996 | Okamura et al. ........ 220/62.22 |
| 5,607,897 | A | * | 3/1997 | Masuda ....................... 428/195 |
| 5,955,181 | A | * | 9/1999 | Peiffer et al. .......... 264/173.12 |

FOREIGN PATENT DOCUMENTS

| DE | 195 00 377 A1 | | 9/1995 |
| EP | 0 503 443 A1 | | 9/1992 |
| EP | 0 504 651 A1 | | 9/1992 |
| EP | 0 602 964 A1 | | 6/1994 |
| EP | 0 612 790 A2 | | 8/1994 |
| EP | 0 685 509 A1 | | 12/1995 |
| EP | 0 707 979 A2 | | 4/1996 |
| EP | 0 952 176 A1 | | 10/1999 |
| JP | 8036739 A | | 2/1996 |
| JP | 11-320672 | * | 11/1999 |
| JP | 11-320789 | * | 11/1999 |
| WO | WO 01/60608 A1 | | 8/2001 |

* cited by examiner

Primary Examiner—Vivian Chen
(74) Attorney, Agent, or Firm—ProPat, L.L.C.

(57) ABSTRACT

The invention relates to a coextruded, transparent, biaxially oriented polyester film having at least three layers, with at least one base layer B, at least 80% by weight of which is composed of a thermoplastic polyester, where an outer layer has been applied to each surface of this base layer, and where at least one outer layer comprises particles, wherein the gloss of both surfaces of the film is above 170 the haze of the film is below 2.4% the planar orientation $\Delta p$ of the film is below 0.162.

the coefficient of friction (COF) is below 0.6. The invention further relates to the use of a film of this type, and also its production.

10 Claims, No Drawings

MULTILAYER, TRANSPARENT, BIAXIALLY ORIENTED POLYESTER FILM

SUMMARY OF THE INVENTION

The invention relates to a transparent, biaxially oriented polyester film having at least three layers, with at least one base layer B, and at least two outer layers A and C, which, due to its low planar orientation Δp, is highly suitable for use as a lid film, in particular as a lid film for yoghurt pots using the mix pap system. The invention also includes the use of the film and a process for its production.

BACKGROUND OF THE INVENTION

Lids, e.g. lids for yoghurt pots, are a known application of biaxially oriented polyester films. They are used here as an alternative to aluminum films. Lids made from polyester film are currently essentially divided into the two types described in some detail below:

Firstly, lids composed solely of polyester film. In the case of lids of this type, the upper side of the film (i.e. of the lid) is printed and the underside of the film (i.e. the inner side of the lid) is provided with a surface coating which is used for adhesive bonding of the lid to the pot. To improve the shelf life of the yoghurt, both the pot and the lid have to have adequate light-protection properties. This is generally achieved by coloring the materials for the lid and for the pot with titanium dioxide or with other suitable pigments or dyes. Another important requirement placed upon the lid film is that its mechanical properties have been selected so as to prevent initiation or propagation of tearing during pull-off from the pot. There must also be no delamination of the film during pull-off from the pot. The film obtains the mechanical properties required by way of biaxial stretching and by being sufficiently thick. The mechanical properties of the lid (stiffness, puncture resistance, tear propagation resistance, etc.) improve more than proportionally as the thickness of the film increases. Polyester films of thickness from 30 to 100 μm have proven successful for yoghurt lid applications. However, the thickness of the film cannot be raised without restriction, since as thickness increases material costs rise and sealing cycle times are adversely affected, with undesirable economic consequences. The advantages of these lids are clear:

- The polyester film lid has a smooth, highly glossy surface which ensures excellent color reproduction and is therefore visually highly attractive.
- The film has up to 700% higher puncture resistance than conventional material, resulting in substantially greater protection of the product.
- The lid is easy to open without leaving fragments of the lid on the pot in the manner observed when using conventional materials. This is a property particularly valued by the consumer.
- The complete separation of pot from lid is highly advantageous for the recyclability of the two materials. The lid film is composed of thermoplastic polyester, which has excellent recyclability. The product is therefore both environmentally safe and environmentally compatible.
- In addition, the lid is completely free from metal. This ensures a very high level of safety during metal detection, which is increasingly frequently employed during food production. Using this method it is therefore possible to determine with high accuracy the proportion of metallic constituents present in the contents.

Besides the abovementioned lids composed solely of polyester there are also known lids which are composed of a composite made from transparent, biaxially oriented polyester film and paper. Polyester film here is unlike the type first mentioned in being a comparatively thin biaxially oriented film, generally of thickness about 12 μm. The two materials (paper and polyester film) are laminated using a suitable adhesive and processed to give lids. The stiffness required from the lid is provided by laminating polyester film to paper to give a thick laminate. Here, the side of the polyester film located toward the paper is generally aluminum-metallized. This means that the lid still has the metallic character shown by a lid made purely from aluminum foil. The other side of the polyester film (outward-facing side of the film, facing away from the composite) is coated with a suitable adhesive and then adhesively bonded to the pot made from PP or PS. The laminate described has become known in the packaging market as the "mix pap system".

In principle, the latter type has the same good properties as the former type. However, it is capable of substantially more cost-effective production than the former type, but it always has to be borne in mind that it is substantially more susceptible to mechanical damage than the former type since the film used is thinner. The laminate cannot have the same good mechanical properties as the polyester film of about 60 μm thickness. Particularly during pull-off of the lid from the pot, tearing can initiate and propagate in the polyester film, or there can be delamination. This makes the pull-off performance of the lid unpredictable. Satisfactory pull-off behavior is a particular reason for optimizing the mechanical properties of the polyester film, but avoiding any resultant increase in its production costs. The polyester film used in the present application should moreover be highly transparent and of high gloss, particularly so as to permit the metallic character of the metallized lid to be utilized as effectively as possible for promotional purposes. Known commercially available films do not fully meet this requirement. For example, the TERPHANE® 10.62 product data sheet from Toray Plastic Europe describes a polyester film used for this application. The specific mechanical properties required for the application are characterized by way of what is called the ISOTROPY values. The only optical property listed is haze, the value being about 3.5% according to the data sheet. Nothing is said about the gloss of the film, despite the fact that it is these two properties which substantially characterize its appearance.

The Nu Roll® 12 PXO product data sheet from Nu Roll moreover describes a polyester film used for this application. The specific mechanical properties required for the application are characterized by way of what is called the ISOTROPY values. The only optical property listed is haze, the value being about 2.3% according to the data sheet. Nothing is said about the gloss of the film, despite the fact that it is these two properties which substantially characterize its appearance.

EP-A 0 685 509 describes a transparent, biaxially oriented polyester film for laminating cans, composed of a mixture of from 70 to 40% by weight of polyethylene terephthalate and from 30 to 60% by weight of polybutylene terephthalate, the film being characterized by the following parameters

- the crystallization temperature is in the range from 65 to 120° C.
- the second transition temperature is above 40° C.
- the planar orientation lap is in the range from 0.12 to 0.19
- no white spots occur in the film once it has been laminated to the can.

Due to its composition and its resultant mechanical and optical properties, the film is unsuitable for mix pap applications.

EP-A 0 707 979 describes a transparent, biaxially oriented polyester film for thermal transfer applications and having a specific coating made from water-soluble substances based on urethane, on polyester, and on acrylates. The film is characterized by planar orientation Δp in the range from 0.145 to 0.169. The coating used and the pigment system used make the film unsuitable for mix pap applications. The film is too expensive (coating costs are too high, since the film cannot be recycled), and its haze is too high and its gloss is too low.

EP-A 0 612 790 describes a transparent, biaxially oriented polyester film for magnetic tape applications, comprising a particle system made from crosslinked polymers. The film is to be characterized by a planar orientation Δp above 0.14. All of the films listed in the examples have a planar orientation Δp of 0.17. The planar orientation Δp of 0.17 given in the examples and the pigment system used make the film unsuitable for mix pap applications. The film is too expensive (costs for the pigments are too high, and in addition the pigments used have a tendency toward undesirable agglomeration), and its haze is too high and its gloss is too low.

It was therefore an object of the invention to provide a multilayer, biaxially oriented polyester film with better properties than prior art films, for mix pap applications. In particular, the novel polyester film is to be characterized by the following combination of properties high gloss, (i.e. >170)
low haze (i.e. <2.4%)
good processability (i.e. no blocking, COF<0.6, good windability)
good mechanical properties, giving a low level of tendency toward delamination of the film during pull-off of the film composite from the pot (i.e. Δp<0.162)
capability for cost-effective production (i.e. no break-off, regrind is reusable).

The mechanical properties of the film should be such that no delamination and/or initiation or propagation of tear takes place in the film, particularly during pull-off of the lid from the pot. In addition, the film should be capable of cost-effective production. A particular requirement during production of the film is to ensure that regrind can be reintroduced into the extrusion process at a concentration of from 20 to 60% by weight, based on the total weight of the film, without any significant resultant adverse effect on the physical properties of the film.

BRIEF DESCRIPTION OF THE INVENTION

The object is achieved by way of a coextruded, transparent, biaxially oriented polyester film having at least three layers, with at least one base layer B, at least 80% by weight of which is composed of a thermoplastic polyester, where an outer layer has been applied to each surface of this base layer, and where at least one outer layer comprises particles, wherein the gloss of both surfaces of the film is above 170
the haze of the film is below 2.4%
the COF is below 0.6, and
the planar orientation Δp of the film is below 0.162.

DETAILED DESCRIPTION OF THE INVENTION

According to the invention, the film is characterized by very high gloss. According to the invention, the gloss of both surfaces is above 170, in particular above 175, and particularly preferably above 180. The metallic character of the metallized lid is thus given particular prominence for promotional purposes.

The film has low haze. The haze of the film of the invention is below 2.4%, preferably below 2.2%, and particularly preferably below 2.0%. This ensures that the overall lid structure is provided with a particularly brilliant appearance.

The coefficient of friction COF should be below 0.6. In the preferred embodiment, the COF is below 0.55, and in the particularly preferred embodiment it is below 0.5. In the preferred embodiment, the processing behavior of the film is particularly good.

The planar orientation Δp of the film of the invention is below 0.162, preferably below 0.160, and particularly preferably below 0.158. Surprisingly, the comparatively low planar orientation Δp of the film improves its delamination properties, i.e. its tendency toward delamination is reduced.

According to the invention, the structure of the film has at least three layers and on one side of the layer B (=base layer) has the outer layer A, and on the other side of the base layer B has another outer layer C made from polyethylene terephthalate. Both outer layers comprise the particles advantageous for the production and processing of the film.

A variety of raw materials may in principle be used for the materials of the various layers, but it is preferable for the production of each layer to be based on polyesters.

At least 90% by weight of the base layer B of the film is preferably composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, preferably at least 95 mol %, and particularly preferably 97 mol %, of which is composed of ethylene glycol units and terephthalic acid units, or of ethylene glycol units and naphthalene-2,6-dicarboxylic acid units. The remaining monomer units derive from other aliphatic, cycloaliphatic or aromatic diols and, respectively, dicarboxylic acids, as may also occur in the layer A (or in layer C).

Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$ alkanediacids are particularly suitable, and the alkane moiety here may be straight-chain or branched One way of preparing the polyesters is the transesterification process. Here, the starting materials are dicarboxylic esters and diols, which are reacted using the customary transesterification catalysts, such as the salts of zinc, of calcium, of lithium, of magnesium, or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

The polymers used for the outer layers and for any intermediate layers present may in principle be the same as those used for the base layer. Besides these, other materials may also be present in the outer layers, the outer layers then preferably being composed of a mixture of polymers, or of a copolymer or of a homopolymer which contain ethylene 2,6-naphthalate units and ethylene terephthalate units. Up to 10 mol % of the polymers may be composed of other comonomers (see above).

For processing the polymers it has proven useful to select the polymers for the base layer and the other layers in such a way that there is no excessive difference between the viscosities of the respective polymer melts. If this is not the case it is likely that there will be additional elevations/protrusions, flow disturbances, or streaking on the finished film. To describe the viscosity ranges of the two melts use is made of a modified solution viscosity (SV or standard viscosity). The SVs of commercially available polyethylene terephthalates suitable for producing biaxially oriented films are in the range from 600 to 1000. For the purposes of the present invention, in order to ensure satisfactory film quality the SV of the polymers on layer A or C should be in the range from 500 to 1200, preferably in the range from 550 to 1150, particularly preferably in the range from 600 to 1000. If desired, the respective pellets can be subjected to solid phase condensation in order to achieve the SV needed for the materials. The SV of the polymer melts for the base layer and for the other layers should not differ by more than 200 units, and should preferably not differ by more than 150 units, and in particular should not differ by more than 100 units.

The base layer B and any other layers present may also comprise conventional additives, such as stabilizers and antiblocking agents. It is appropriate for these to be added to the polymer or to the polymer mixture before melting begins. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used in the preparation of the polyesters, carbon black, titanium dioxide, kaolin or polymer particles, such as crosslinked polystyrene particles or crosslinked acrylate particles.

The antiblocking agents selected may also be mixtures of two or more different antiblocking agents or mixtures of antiblocking agents of the same composition but different particle size. The particles may be added to the individual layers at the respective advantageous concentrations, e.g. as a glycolic dispersion during the polycondensation or by way of masterbatches during extrusion. An example of a detailed description of the antiblocking agents is found in EP-A-0 602 964.

The concentration of the inert particles in outer layers A and C is from 0.01 to 0.4% by weight, preferably from 0.02 to 0.35% by weight, particularly preferably from 0.025 to 0.30% by weight, and very particularly preferably from 0.030 to 0.25% by weight, and essentially depends on the size of the particles used.

For achieving the object it has proven appropriate to select the concentration of the particles within the film in such a way that the ash content of the film is below 0.20%, preferably below 0.18%, and particularly preferably below 0.16%.

For achieving the object it has also proven appropriate for the nature of the particles, the concentration of the particles, and the particle diameter within the film to be selected in such a way that the average roughness ($R_a$) of the two surfaces of the film is within the range from 40 to 120 nm, preferably within the range from 45 to 110 nm, and particularly preferably within the range from 50 to 100 nm, and in such a way that the coefficient of friction of the two surfaces of the film is below 0.6, preferably below 0.55, and particularly preferably below 0.5. The processing behavior of the film is then particularly good.

Preferred particles are $SiO_2$ in colloidal or in chain form. These particles become very well bound into the polymer matrix and create only very few vacuoles. Vacuoles generally cause haze and it is therefore appropriate to avoid these. There is no restriction in principle on the diameters of the particles used.. However, it has proven appropriate for achieving the object to use particles with an average primary particle diameter below 100 nm, preferably below 60 nm and particularly preferably below 50 nm, and/or particles with an average primary particle diameter above 1 $\mu$m, preferably above 1.5 $\mu$m and particularly preferably above 2 $\mu$m. However, the average diameter of the particles should not be above 5 $\mu$m The pigmentation of those layers which are unrelated to the outer layers can therefore vary greatly and depends essentially on the structure of the film (the layer structure) and on the requirements placed upon the film with respect to achievement of other optical properties (e.g. haze), and on behavior during production and processing.

If the film is the film of the invention which has three layers, with the base layer B and with the two outer layers A and C, the concentration of particles in the base layer B is then preferably lower than in the outer layers. In the case of the three-layer film of the type specified, the concentration of particles in the base layer B is from 0 to 0.06% by weight, preferably from 0 to 0.04% by weight, particularly preferably from 0 to 0.03% by weight, and very particularly preferably from 0 to 0.02% by weight. Although there is no restriction in principle on the diameter of the particles used, preference is given to particles with an average diameter above 1 $\mu$m. Particular preference is given to particles with an average diameter above 1.5 $\mu$m.

The polyester film of the invention has a three-layer structure and encompasses the two outer layers A and C. The thickness and composition of the second outer layer C may be selected without reference to those of outer layer A, and the second outer layer may likewise comprise the abovementioned polymers or polymer mixtures, but these do not have to be identical with those of the first outer layer. The second outer layer may also comprise other commonly used outer layer polymers.

Between the base layer and the outer layers there may, where appropriate, also be an intermediate layer. This may again be composed of the polymers described for the base layers. In one particularly preferred embodiment, it is composed of the polyester used for the base layer. It may also comprise the customary additives described. The thickness of the intermediate layer is generally above 0.3 μm, preferably in the range from 0.5 to 15 μm, in particular in the range from 1.0 to 10 μm and very particularly preferably in the range from 1.0 to 5 μm.

In the particularly advantageous three-layer embodiment of the novel film, the thicknesses of the outer layers A and C are generally above 0.1 μm, and are generally in the range from 0.2 to 2.5 μm, preferably in the range from 0.2 to 2.2 μm, particularly preferably in the range from 0.3 to 2.0 μm, and very particularly preferably in the range from 0.3 to 1.8 μm, and the thicknesses of the outer layers A and C may be identical or different.

The total thickness of the novel polyester film may vary within certain limits and depends on the intended application. It is from 6 to 30 μm, in particular from 7 to 25 μm, preferably from 8 to 20 μm, the layer B preferably making up from 50 to 95% of the total thickness.

To produce layers A and C (outer layer(s) A and C) it is appropriate to introduce pellets made from the corresponding polymer into one or two extruders. The materials are melted and extruded at about 300° C.

The polymers for the base layer B are appropriately introduced by way of another extruder. Any foreign bodies or contamination present may be filtered out from the polymer melt prior to extrusion. For the multilayer film of the invention the melts are then extruded through a coextrusion die to give flat melt films, and layered one upon the other. The multilayer film is then drawn off and solidified with the aid of a chill roll and, if desired, other rolls.

The invention therefore also provides a process for producing the novel polyester film by the coextrusion process known per se.

The procedure for this process is that the melts corresponding to the film are coextruded through a flat-film die, the resultant film is drawn off for solidification on one or more rolls, the film is then biaxially stretched (oriented), and the biaxially stretched film is heat-set and, if desired, corona- or flame-treated on the surface layer intended for treatment.

The biaxial stretching (orientation) is generally carried out sequentially, and preference is given to sequential biaxial stretching in which stretching is first longitudinal (in the machine direction) and then transverse (perpendicular to the machine direction).

As is usual in coextrusion, the polymer or the polymer mixture for the individual layers is first compressed and plasticized in the respective extruder, and the additives which are used where appropriate may already be present in the polymer or the polymer mixture during this process. The melts are then simultaneously extruded through a flat-film die (slot die), and the extruded multilayer film is drawn off on one or more take-off rolls, whereupon it cools and solidifies.

The biaxial orientation is generally carried out sequentially, preferably orienting first longitudinally (i.e. in the machine direction=MD) and then transversely (i.e. perpendicularly to the machine direction=TD). This gives orientation of the molecular chains. The longitudinal orientation can be carried out with the aid of two rolls running at different speeds corresponding to the desired stretching ratio. For the transverse orientation use is generally made of an appropriate tenter frame.

The temperature at which the orientation is carried out may vary over a relatively wide range and depends on the film properties desired. The longitudinal stretching is generally carried out at from 80 to 140° C., and the transverse stretching at from 90 to 150° C. The longitudinal stretching ratio is generally in the range from 2.0:1 to 6:1, preferably from 2.5:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of a metal layer or of any printing ink applied, or else to improve antistatic performance or processing performance.

For producing a film with very good pull-off behavior and delamination behavior (there must be no delamination of the film during pull-off) it has proven advantageous for the planar orientation $\Delta p$ of the film to be below 0.162. The strength of the film in the direction of its thickness is then sufficiently great that there is definitively no delamination or, respectively, initiation or propagation of tearing of the film, during pull-off of the lid from the pot.

The significant variables affecting the planar orientation of the film $\Delta p$ have been found to be the longitudinal and transverse stretching parameters, and also the SV (standard viscosity) of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine.

For example, if the planar orientation of the film $\Delta p$ obtained on a particular film-production plant is 0.167 with the following set of parameters: $\lambda_{MD}$=4.8 and $\lambda_{TD}$=4.0, a longitudinal stretching temperature $T_{MD}$ of 115° C. and a transverse stretching temperature $T_{TD}$ of 125° C., then increasing the longitudinal stretching temperature $T_{MD}$ to 125° C. or increasing the transverse stretching temperature $T_{TD}$ to 135° C., or lowering the longitudinal stretching ratio $\lambda_{MD}$ to 4.0 or lowering the transverse stretching ratio $\lambda_{TD}$ to 3.6 gives planar orientation $\Delta p$ of 0.160. The film web speed here is 340 m/min and the SV of the material is about 730. The temperatures given are based on the respective roller temperatures in the case of longitudinal stretching and on film temperatures measured by IR (infrared) in the case of transverse stretching.

In the heat-setting which follows, the film is held for from 0.1 to 10 s at a temperature of from about 150 to 250° C. The film is then wound up in a usual manner. A generalized procedure appropriate for achieving the $\Delta p$ of the invention, starting from a set of parameters which gives a film whose $\Delta p$ is not in accordance with the invention, is either:

a) to increase the stretching temperature in the MD by $\Delta T$=from 3 to 15 K, preferably by $\Delta T$=from 5 to 12 K, and particularly preferably by $\Delta T$=from 7 to 10 K, or b) to lower the stretching ratio in the MD by $\Delta\lambda$=from 0.3 to 0.8, preferably by $\Delta\lambda$=from 0.35 to 0.7, and particularly preferably by $\Delta\lambda$=from 0.4 to 0.6, or c) to lower the stretching temperature in the TD by $\Delta T$=from 4 to 15 K, preferably by $\Delta T$=from 5 to 12 K, and particularly preferably by $\Delta T$=from 6 to 10 K, or d) to lower the stretching ratio in the TD by $\Delta\lambda$=from 0.3 to 0.8, preferably by $\Delta\lambda$=from 0.35 to 0.7, and particularly preferably by $\Delta\lambda$=from 0.4 to 0.6.

It is also possible where appropriate, to combine one or more of the above measures a) to d). It has proven particularly advantageous here to combine measures a) and b).

After the biaxial stretching it is preferable for one or both surfaces of the film to be corona- or flame-treated by one of the known methods. The intensity of the treatment generally gives a surface tension in the range above 45 mN/m.

The film may also be coated in order to achieve other desired properties. Typical coatings are layers with adhesion-promoting, antistatic, slip-improving or release action. These additional layers may, of course, be applied to the film by way of in-line coating, using aqueous dispersions, prior to the transverse stretching step.

For metalizing the film, the metal layer is preferably composed of aluminum. However, other materials which can be applied in the form of a thin coherent layer are also suitable. A particular example of a suitable material is silicon, which unlike aluminum gives a transparent barrier layer. The oxidic layer is preferably composed of oxides of elements of main group II, III or IV of the Periodic Table, in particular of magnesium oxides, of aluminum oxides or of silicon oxides.

The metallic or oxidic layers are applied in conventional industrial systems. Metallic layers made from aluminum are usually produced by metalizing in conventional metalizers (boat method). In the case of oxidic layers, electron beam processes or sputter-application have also proven particularly successful. The process parameters for the equipment during application of the metallic or oxidic layer to the films are standard conditions. The metalizing of the films preferably gives an optical density in the usual range of from about 2.2 to 2.8 for the metalized films. The oxidic layer is applied to the film so as to give a thickness of the oxidic layer preferably in the range from 30 to 100 nm.

The film of the invention has good processability, in particular excellent performance in pull-off from the pot. The film of the invention in particular has extremely little tendency toward initiation or propagation of tearing or toward delamination.

The film also has excellent visual properties, also giving the film, particularly after metalization, a highly attractive appearance effective for promotional purposes. It has been ensured that during the production of the film it is possible to reintroduce regrind into the extrusion process at a concentration of from 20 to 60% by weight, based on the total weight of the film, without any significant resultant adverse effects on the physical properties of the film.

The table below (Table 1) again gives the most important film properties of the invention.

The following test methods were used to characterize the raw materials and the films:

Test Methods

SV (Standard Viscosity)

The standard viscosity SV (DCA) was measured in dichloroacetic acid by a method based on DIN 53726. The intrinsic viscosity (IV) can be calculated from the standard viscosity as follows $$IV(DCA) = 6.67 \cdot 10^{-4} SV(DCA) + 0.118$$

Surface Tension

Surface tension was determined by what is known as the ink method (DIN 53 364).

Gloss

Gloss was determined to DIN 67 530. Reflectance was measured, being an optical value characteristic of a film surface. Based on the standards ASTM-D523-78 and ISO 2813, the angle of incidence was set at 20°. A beam of light hits the flat test surface at the set angle of incidence and is reflected and/or scattered thereby. A proportional electrical variable is displayed, representing light rays hitting the photoelectronic detector. The value measured is dimensionless and must be stated together with the angle of incidence.

Coefficient of Friction

The coefficient of friction was determined to DIN 53 375, 14 days after production.

Haze

The method for measuring the Hölz haze of the film was based on ASTM-D1003-52 but, in order to utilize the most effective measurement range, measurements were made on four pieces of film laid on top of one another, and a 1° slit diaphragm was used instead of a 4° pin hole.

Ash Content

Ash content is determined using internal plant specification no. 8 and is based on DIN 53 568 and DIN 3451 test standards. The pre-ashing of the specimens is carried out not in a naked flame but in an electrically heated high-speed ashing apparatus without any production of soot. After ashing, the specimen is calcined in a muffle furnace at 600° C. to constant weight, and then weighed.

Roughness

The roughness $R_a$ of the film was determined in DIN 4768, with a cut-off of 0.25 mm.

Determination of Planar Orientation $\Delta p$

Planar orientation is determined by measuring the refractive index with an Abbe refractometer, using internal plant specification 24.

Specimen Preparation

Specimen Size

Length: from 60 to 100 mm

Width: corresponds to prism width of 10 mm

TABLE 1

|  | Inventive range | Preferred | Particularly preferred | Unit | Test method |
|---|---|---|---|---|---|
| Gloss | >170 | >175 | >180 |  | DIN 67 530 |
| Haze | <2.4 | <2.2 | <2.0 | % |  |
| Planar orientation $\Delta p$ | <0.162 | <0.160 | <0.158 |  | internal |
| Roughness | 40–120 | 45–110 | 50–110 | nm | DIN 53 375 |
| Coefficient of friction | <0.6 | <0.55 | <0.5 |  | DIN 4768 |
| Thickness | 6–30 | 7–25 | 8–20 | μm |  |
| Filler concentration in outer layers | 0.01–0.4 | 0.02–0.35 | 0.025–0.3 | % |  |
| Ash content | <0.20 | <0.18 | <0.16 | % |  |

To determine $n_{MD}$ and $n_a$ (=$n_z$), the specimen to be tested has to be cut out from the film with the running edge of the specimen running precisely in TD. To determine $n_{TD}$ and $n_a$ (=$n_z$), the specimen to be tested has to be cut out from the film with the running edge of the specimen running precisely in MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is placed on the crossing point of the two diagonal lines using the lower knurled screw, and the value indicated on the scale is read off and entered into the table.

The specimen is then turned, and the corresponding refractive indices $n_{MD}$ and $n_a$ (=$n_z$) of the other side are measured and entered into an appropriate table. After determining the refractive indices in, respectively, MD and the direction of the thickness of the film, the specimen strip cut out in MD is placed in position and the refractive indices $n_{TD}$ and $n_a$ (=$n_z$) are determined accordingly. The strip is turned over, and the values for the B side are measured. The values for the A side and the B side are combined to give average refractive indices. The orientation values, $\Delta n$, $\Delta p$, and $n_{av}$, are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Assessment of performance of film in pull-off from pot
The performance of the film in pull-off from the pot is assessed visually. In this test method, the film (the lid) is adhesively bonded to the pot and pulled off the pot after a storage time (hardening time) of 48 h. The pull-off performance is evaluated as

| | |
|---|---|
| ++ | (= good) if there is no initiation of tearing in, nor any delamination of, the film during this process |
| -- | (= poor) if there is initiation of tearing in, and/or delamination of, the film during this process |
| +- | (= intermediate) |

EXAMPLE 1

Polyethylene terephthalate chips (produced by the transesterification process with Mn as transesterification catalyst, Mn concentration: 70 ppm) were dried at 150° C. to residual moisture below 100 ppm and introduced into the extruder for the base layer B.

Alongside this, polyethylene terephthalate chips (produced by the transesterification process with Mn as transesterification catalyst, Mn concentration: 100 ppm) comprising a silicon-dioxide-based filler were dried at 150° C. to residual moisture below 100 ppm and likewise introduced into the extruder for outer layers A and C.

Coextrusion, followed by stepwise longitudinal and transverse orientation, was used to produce a transparent, three-layer film with symmetrical (ABA) structure and with a total thickness of 12 μm. The thickness of each outer layer A and C was 1.0 μm.

Outer layers A and C (A=C) were a mixture made from:

| | |
|---|---|
| 86.0% by weight | of polyethylene terephthalate 4020 from KOSA with SV of 800 |
| 14.0% by weight | of masterbatch made from 99.0% by weight of polyethylene terephthalate (SV of 800) and 0.5% by weight of Sylobloc ® 44 H (colloidal SiO$_2$ from Grace), and 0.5% by weight of Aerosil ® TT 600 (chain-type SiO$_2$ from Degussa) |
| Base layer B: | |
| 100.0% by weight | of polyethylene terephthalate 4020 from KOSA with SV of 800 |

The production conditions in each step of the process were:

| | | |
|---|---|---|
| Extrusion: | Temperatures layer B: | 290° C. |
| | Take-off roller temperature: | 30° C. |
| Longitudinal stretching: | Temperature: | 125° C. |
| | Longitudinal stretching ratio: | 3.3 |
| Transverse stretching: | Temperature: | 135° C. |
| | Transverse stretching ratio: | 4.0 |
| Heat-setting: | Temperature: | 230° C. |
| | Duration | 3 s |

The film had the desired optical properties, the desired processing behavior, and in particular the desired performance during pull-off of the film from the pot. No tearing is initiated in the film, and it shows no tendency toward delamination.

The film properties achieved in films produced in this way are shown in Table 2.

Comparative Example 1

A change was now made from Example 1 in the raw material composition for the two outer layers A and C.

Outer layers A and C (A=C) were a mixture made from:

| | |
|---|---|
| 55.0% by weight | of polyethylene terephthalate 4020 from KOSA with SV of 800 |
| 45.0% by weight | of masterbatch made from 99.0% by weight of polyethylene terephthalate (SV of 800) and 0.5% by weight of Sylobloc ® 44 H (colloidal SiO$_2$ from Grace), and 0.5% by weight of Aerosil ® TT 600 (chain-type SiO$_2$ from Degussa) |

The processing conditions were unchanged from Example 1.

The film did not exhibit the desired optical properties. The metalization has an undesirable matt effect.

Comparative Example 2

The processing conditions were now changed from Example 1, but there was no change from Example 1 in the high. In addition, the film did not exhibit the desired optical properties. The metalization has an undesirable matt effect.

Comparative Example 5

Example 1 of EP 0 612 790 was repeated. The film does not exhibit the desired performance during pull-off of the film from the pot. Tearing is initiated in the film, which shows a high tendency toward delamination.

In addition, the film did not exhibit the desired optical properties. The haze of the film is too high and the gloss is too low. The metalization has an undesirable matt effect.

TABLE 2

| Example | Film thickness μm | Gloss | Haze % | Planar orientation Δp | Roughness nm | Coefficient of friction | Processing behavior | Lid pull-off performance |
|---|---|---|---|---|---|---|---|---|
| Example 1 | 12 | 190 | 1.8 | 0.157 | 50 | 0.42 | ++ | ++ |
| Comparative Example 1 | 12 | 140 | 3.9 | 0.157 | 70 | 0.38 | ++ | ++ |
| Comparative Example 2 | 12 | 190 | 1.8 | 0.168 | 50 | 0.41 | ++ | -- |
| Comparative Example 3 = EP0685509 | 12 | 150 | 3.3 | 0.156 | 50 | 0.54 | ++ | + |
| Comparative Example 4 = EP0707979 | 5 | 145 | 3.8 | 0.165 | 60 | 0.45 | --i) | -- |
| Comparative Example 5 = EP0612790 | 15 | 140 | 4.8 | 0.170 | 20 | 0.42 | + | -- | i) Due to excessively low thickness of film raw material composition for the base layer B:

| | | |
|---|---|---|
| Extrusion: | Temperatures layer B: | 290° C. |
| | Take-off roller temperature: | 30° C. |
| Longitudinal stretching: | Temperature: | 115° C. |
| | Longitudinal stretching ratio: | 4.2 |
| Transverse stretching: | Temperature: | 120° C. |
| | Transverse stretching ratio: | 4.0 |
| Heat-setting: | Temperature: | 230° C. |
| | Duration | 3 s |

The film does not exhibit the desired performance during pull-off of the film from the pot. Tearing is initiated in the film, which shows a high tendency toward delamination.

Comparative Example 3

Example 1 of EP 0 685 509 was repeated. The film did not have the required good processing behavior. On metalizing the film, creases formed in the roll and prevented further processing to give lids. In addition, poor mechanical properties meant that during metalizing of the film there was excessive stretching of the film web, and this further impaired the presentation of the roll. It was not possible to laminate the film to the paper.

Comparative Example 4

Example 1 of EP 0 707 979 was repeated. Due to the coating used, the production costs of the film were far too

What is claimed is:

1. A coextruded, transparent, biaxially oriented polyester film having at least three layers, with at least one base layer B, at least 80% by weight of which is composed of a thermoplastic polyester, where an outer layer has been applied to each surface of this base layer, and where at least one outer layer comprises particles, wherein
   the gloss of both surfaces of the film is above 170
   the haze of the film is below 2.4%
   the planar orientation Δp of the film is below 0.162, and
   the coefficient of friction (COF) of the surface of the film is below 0.6.

2. The transparent, biaxially oriented polyester film as claimed in claim 1, wherein the planar orientation Δp is below 0.160.

3. The transparent, biaxially oriented polyester film as claimed in claim 1, wherein the gloss is above 175.

4. The transparent, biaxially oriented polyester film as claimed in claim 1, wherein the haze is below 2.0%.

5. The transparent, biaxially oriented polyester film as claimed in claim 1 wherein the film has three layers.

6. The transparent, biaxially oriented polyester film as claimed in claim 1, wherein the film has more than one layer and has ABA or ACBCA structure.

7. The transparent, biaxially oriented polyester film as claimed in claim 1, wherein the total thickness of the polyester film is from 4 to 50 μm.

8. The transparent, biaxially oriented polyester film as claimed in claim 1, wherein at least one outer layer of the polyester film has a concentration, based on the weight of the outer layer, of from 0.01 to 0.4% by weight of particles.

9. The transparent, biaxially oriented polyester film as claimed in claim 1, wherein the particles have been selected from the following materials: calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc, or manganese salts of the dicarboxylic acids used in polyester preparation, carbon black, titanium dioxide, kaolin, polymer particles, and mixtures thereof.

10. A process for producing a film as claimed in claim 1, where the melts corresponding to the individual layers of the film are coextruded through a flat-film die, the resultant film is drawn off on at least one roller for solidification, the film is then biaxially stretched, and the biaxially stretched film is heat-set which process comprises the step of biaxially stretching the film which stretching encompasses at least one longitudinal stretching of the film (in MD=machine direction) and at least one transverse stretching of the film (in TD=perpendicular to the machine direction), and where, compared with a film whose $\Delta p$ value is not <0.162, either:

a) the stretching temperature in the MD has been increased by $\Delta T$=from 3 to 15 K, or b) the stretching ratio in the MD has been lowered by $\Delta \lambda$=from 0.3 to 0.8, or c) the stretching temperature in the TD has been increased by $\Delta T$=from 4 to 15 K, or d) the stretching ratio in the TD has been lowered by $\Delta \lambda$=from 0.3 to 0.8, or two or more of the above measures a) to d) have been combined with one another.

* * * * *